May 3, 1960
G. N. CONTI ET AL
2,934,866
METHOD FOR BELLOWS FILLING
Filed Oct. 25, 1957
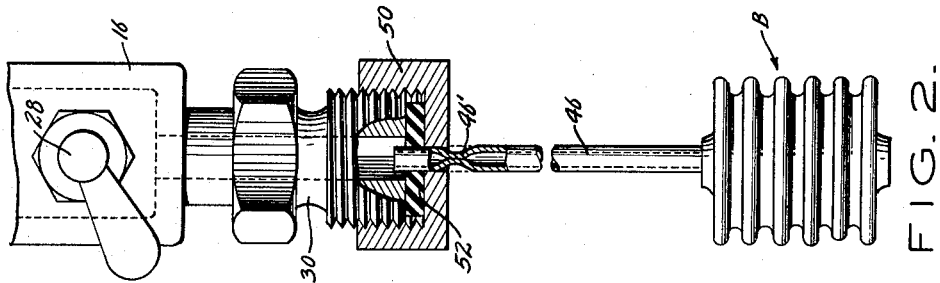
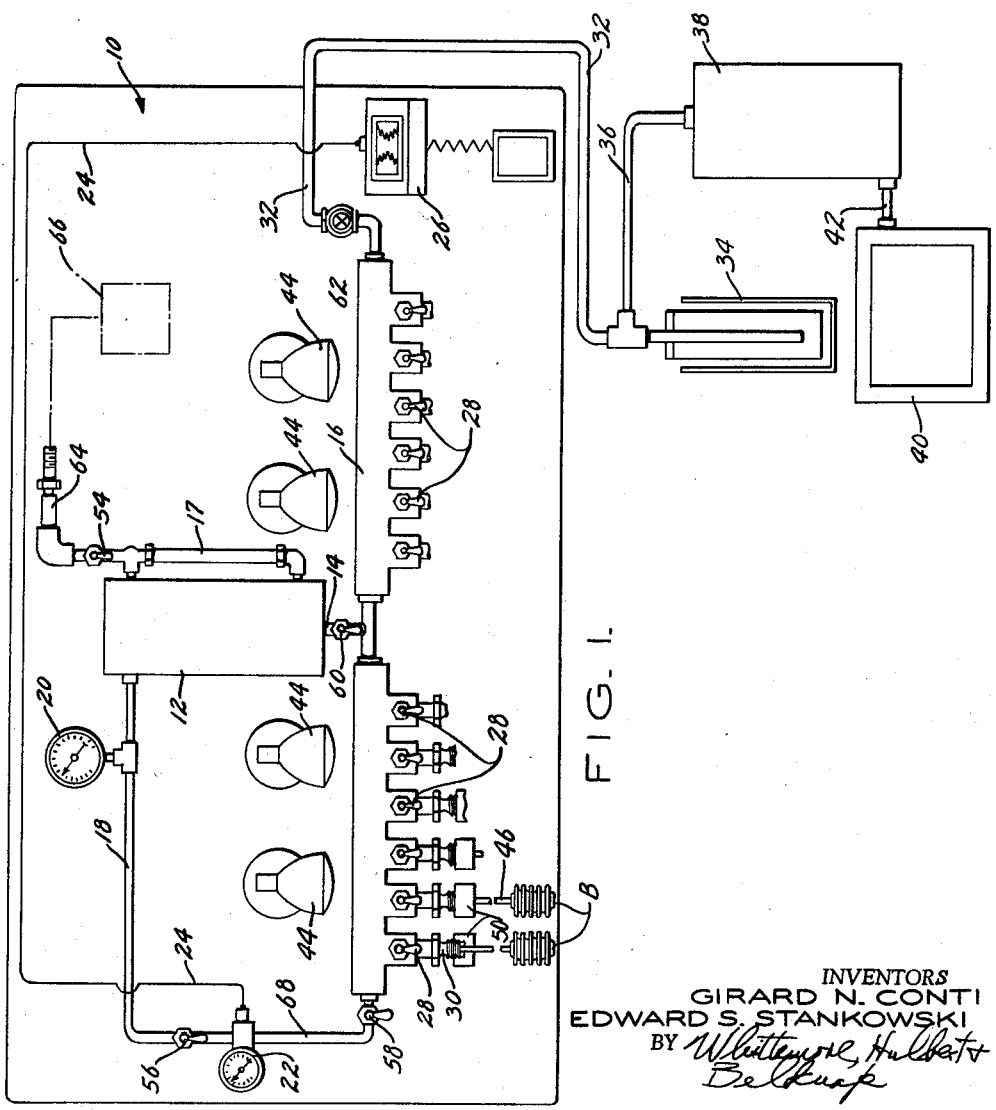
INVENTORS
GIRARD N. CONTI
EDWARD S. STANKOWSKI
BY 2,934,866

METHOD FOR BELLOWS FILLING

Girard N. Conti, Mount Clemens, and Edward S. Stankowski, Centerline, Mich., assignors to Holley Carburetor Company, Van Dyke, Mich., a corporation of Michigan Application October 25, 1957, Serial No. 692,287

8 Claims. (Cl. 53—22)

This invention relates to liquid filled temperature responsive bellows, and more specifically, to a method and apparatus used in charging these said bellows with the desired fluid.

In cases where the bellows are to function as highly sensitive indicating devices and repeatability of performance is within close limits, the customary method of charging becomes quite complex.

The object of this invention is to present an improved method of charging this type of bellows, and an improved apparatus for performing the method, which apparatus is simple in structure and operation in the charging of the bellows with the desired liquid.

Another and more specific object is to provide a method and apparatus for filling bellows in an improved fashion by successive valve controlled operations of evacuating, to a predetermined degree, the system, including the removal of vapor in a supply tank of the liquid with which the bellows is to be filled; opening the bellows to the subatmospheric pressure of the system while further evacuating the latter to a desired pressure, then causing the liquid to flow from the supply tank to the bellows under a super-atmospheric pressure, whereby to fill the bellows, and sealing the filled bellows.

The foregoing as well as other objects will become more apparent as this description proceeds, especially when considered in connection with the accompanying drawing illustrating a preferred embodiment of the invention wherein:

Fig. 1 is a schematic layout of the apparatus of the invention as mounted on a suitable panel; and Fig. 2 is a fragmentary enlarged elevation, partially broken away and in vertical axial section through a manifold fitting unit by which multiple bellows are connected to the apparatus for filling.

In Fig. 1 of the drawing, in which various details are shown schematically, the apparatus is represented as being mounted on a common panel 10. The apparatus is generally comprised of a supply tank 12 which contains the charging fluid and is connected at one end by a conduit 14 to a common manifold 16. Tank 12 is equipped with a conventional sight gage 17. The other end of the supply tank 12 is connected by means of conduit 18 to one end of the same manifold 16.

Two vacuum gages are placed in this conduit 18, one gage 20 being calibrated in inches of mercury and being visibly read, while the other gage 22 is a pressure responsive gage which measures the resistance to an electrical current flow during a range of pressure conditions.

The vacuum gage 22 is connected by means of a suitable electrical conductor 24 to a visibly read, transformer-equipped vacuum gage 26, which registers the microns in the gage 22. The gages 26 and 22 are so calibrated that a change in resistance in gage 22 will give a corresponding change in pressure value on the dial of gage 26. The vacuum gage 20 is positioned in conduit 18 between gage 22 and the supply tank 12.

The manifold 16 has individual valves 28 which operate to open and close the fittings 30 as required. The right hand end of the manifold (Fig. 1) is connected to a conduit 32 which leads to a vacuum flask trap 34, and another conduit 36 leads from conduit 34, just above the flask trap 34, to a diffusion pump 38. A vacuum pump 40 is connected by means of conduit 42 to the side of diffusion pump 38 opposite the conduit 36.

Infra-red heat lamps 44 are positioned above and directed at the manifold 16 in order to supply heat.

The reference character B is applied to the individual bellows to be filled, and a fill tube 46 of each bellows connected to a fitting 30 of the manifold 16 by means of a suitable connector 50 (Fig. 2) and a rubber seal 52. One or any number of the fittings 30 provided by the manifold can be used at one time to attach a corresponding number of bellows units to be filled.

Manual valves 54, 56, 58, 60 and 62 are placed in the conduitry of the system. The valve 54 is connected by a T between the upper end of supply tank 12 and a conduit which is connected by a nipple to a source 66 of superatmospheric pressure; the valve 56 is positioned in conduit 18 between vacuum gages 20 and 22; the valve 58 is in a conduit 68 connecting valve 56 and gage 22 with the manifold 16; the valve 60 is in tank-manifold connecting conduit 14; while the valve 62 is in conduit 32 between the same and flask trap 34 and diffusion pump 38.

In the operation of the above apparatus in accordance with the method of the invention, assuming a series of bellows B to be connected to fittings 30 as shown, the valves 54, 56, 60 and 28 are first closed and valves 58 and 62 are opened. The vacuum pump 40 is started and evacuation of the manifold 16 and conduit 68 is started. This evacuation continues until a certain vacuum reading is obtained at gage 26.

After the manifold reaches the desired pressure, valve 56 is opened in order to allow the air and vapors from the fluid in the supply tank 12 to escape through the manifold 16, sweeping out air, vapor and any existing foreign matter from the latter. This is continued until a state of equilibrium is obtained in the system, when valve 56 is again closed.

Following this, the valves 28 leading to the attached bellows units B are opened and the system is subjected to another evacuation of an abrupt and continuing nature in so far as it affects the individual bellows. The manifold 16 and bellows units should be evacuated to a reading of 15 microns of Hg, for example, and then held at that value for a desired time.

The final charging step is accomplished by closing valves 58 and 62 and opening valve 60, as the result of which liquid in tank 12 flows into the manifold 16 and through fittings 30 into the individual bellows units B. The fluid thus introduced is allowed to set for a predetermined length of time, after which the source 66 of higher than atmospheric pressure is connected to conduit 64 with valve 54 opened. This higher pressure then positively forces the fluid into every possible cavity of the bellows unit B.

After the bellows has set under these conditions, its filling tube 46 is crimped, cut and soldered at 46' (Fig. 2) in order to seal the capillary end adjacent the manifold 16.

The drawing and the foregoing specification constitute a description of the improved method for bellows filling in such full, clear, concise and exact terms as to enable any person skilled in the art to practice the invention, the scope of which is indicated by the appended claims.

What we claim as our invention is:

1. A method of filling bellows or like liquid receiving units from a fluid handling system including a source of supply of the filling liquid, a source of subatmospheric pressure, and a source of super-atmospheric pressure, comprising the steps of subjecting said system, but not said unit, to preliminary evacuation by said source of sub-atmospheric pressure to substantially void the system of liquid vapor; subjecting said system and unit to further evacuation; allowing liquid to flow to said unit from said liquid supply source; and pressurizing said system and said unit from said super-atmospheric source to force said liquid into said unit.

2. A method of filling bellows or like liquid receiving units from a fluid handling system including a source of supply of the filling liquid, a source of sub-atmospheric pressure, and a source of super-atmospheric pressure, comprising the steps of subjecting said system, including said liquid supply source, but excluding said unit, to evacuation by said source of sub-atmospheric pressure; subjecting said system and unit to further evacuation; allowing liquid to flow to said unit from said liquid supply source; and pressurizing said system and said unit from said super-atmospheric source to force said liquid into said unit.

3. A method of filling bellows or like liquid receiving units, comprising the steps of providing for the communication of a unit to be filled with a source of supply of the filling liquid and with a source of sub-atmospheric pressure, and for connection of said liquid supply source both with a source of super-atmospheric pressure and with said sub-atmospheric source, subjecting the system, including said liquid source but not said unit, to evacuation to a predetermined extent by said source of sub-atmospheric pressure to remove vapor collected therein; subjecting said system and unit to further evacuation to remove vapor therefrom, disconnecting said system and unit from said sub-atmospheric source, allowing liquid to flow from said liquid supply source into said unit; and imposing pressure on said liquid from said super-atmospheric source to force the same into said unit.

4. A method of filling bellows or like liquid receiving units, comprising the steps of providing for the communication of a unit to be filled with a source of supply of the filling liquid and with a source of sub-atmospheric pressure, and for connection of said liquid supply source both with a source of super-atmospheric pressure and with said sub-atmospheric source, initially subjecting the system, including said liquid source but not said unit, to evacuation to a predetermined extent by said source of sub-atmospheric pressure to remove vapor collected therein; subjecting said system and unit to further evacuation to remove vapor therefrom, disconnecting said system and unit from said sub-atmospheric source, allowing liquid to flow from said liquid supply source into said unit; imposing pressure on said liquid from said super-atmospheric source to force the same into said unit; and sealing the unit as thus filled prior to disconnecting the same from said system.

5. Apparatus for filling bellows or like liquid receiving units, comprising sources of supply of the filling liquid, of sub-atmospheric pressure, and of super-atmospheric pressure, means for the communication of pressure sources with said liquid supply source and a plurality of the units to be filled, including a manifold to which said units are removably communicated and a conduit system connecting said manifold with said pressure sources, said system being provided with manually operable valves to selectively control communication of said manifold and units with said respective pressure sources, said manifold having individual valved outlets in communication with the respective individual units.

6. Apparatus for filling bellows or like liquid receiving units, comprising sources of supply of the filling liquid, of sub-atmospheric pressure, and of super-atmospheric pressure, means for the communication of pressure sources with said liquid supply source and a plurality of the units to be filled, including a manifold to which said units are removably communicated and a conduit system connecting said manifold with said pressure sources, said system being provided with manually operable valves to selectively control communication of said manifold and units with said respective pressure sources, said manifold having individual valved outlets in communication with the respective individual units, and electrically responsive vacuum gage means to indicate the degree of evacuation of said system by said sub-atmospheric pressure source.

7. Apparatus for filling bellows or like liquid receiving units, comprising sources of supply of the filling liquid, of sub-atmospheric pressure, and of super-atmospheric pressure, means for the communication of pressure sources with said liquid supply source and a plurality of the units to be filled, including a manifold to which said units are removably communicated and a conduit system connecting said manifold with said pressure sources, said system being provided with manually operable valves to selectively control communication of said manifold and units with said respective pressure sources, said manifold having individual valved outlets in communication with the respective individual units, said sub-atmospheric pressure source being a unitary one including vacuum and diffusion pumps connected in series, with a vacuum trap device in the conduitry between said source and said manifold.

8. Apparatus for filling bellows or like liquid receiving units, comprising sources of supply of the filling liquid, of sub-atmospheric pressure, and of super-atmospheric pressure, means for the communication of pressure sources with said liquid supply source and a plurality of the units to be filled, including a manifold to which said units are removably communicated and a conduit system connecting said manifold with said pressure sources, said system being provided with manually operable valves to selectively control communication of said manifold and units with said respective pressure sources, said manifold having individual valved outlets in communication with the respective individual units, said sub-atmospheric pressure source including vacuum and diffusion pumps connected in series, with a vacuum trap device in the conduitry between said source and said manifold, and electrically responsive vacuum gage means to indicate the degree of evacuation of said system by said sub-atmospheric pressure source.

References Cited in the file of this patent
UNITED STATES PATENTS 2,126,532     Cate                      Aug. 9, 1938